(12) United States Patent
Fredette

(10) Patent No.: US 11,488,072 B2
(45) Date of Patent: Nov. 1, 2022

(54) SYSTEM AND METHOD FOR MANAGING EVENT ACCESS RIGHTS

(71) Applicant: Benoît Fredette, Monte Carlo (MC)

(72) Inventor: Benoît Fredette, Monte Carlo (MC)

(*) Notice: Subject to any disclaimer, the term of this patent is extended or adjusted under 35 U.S.C. 154(b) by 34 days.

(21) Appl. No.: 15/575,770

(22) PCT Filed: May 19, 2016

(86) PCT No.: PCT/CA2016/050564
§ 371 (c)(1),
(2) Date: Nov. 20, 2017

(87) PCT Pub. No.: WO2016/183680
PCT Pub. Date: Nov. 24, 2016

(65) Prior Publication Data
US 2018/0158000 A1    Jun. 7, 2018

Related U.S. Application Data

(60) Provisional application No. 62/163,759, filed on May 19, 2015.

(51) Int. Cl.
*G06Q 10/02* (2012.01)
*G06Q 30/08* (2012.01)
*G06Q 30/06* (2012.01)

(52) U.S. Cl.
CPC ......... *G06Q 10/02* (2013.01); *G06Q 30/0601* (2013.01); *G06Q 30/08* (2013.01)

(58) Field of Classification Search
CPC ............................... G06Q 10/02; G06Q 30/08
See application file for complete search history.

(56) References Cited

U.S. PATENT DOCUMENTS 6,023,685 A    2/2000  Brett et al.
6,067,532 A    5/2000  Gebb
(Continued)

FOREIGN PATENT DOCUMENTS

EP    1065637    1/2001
RU    2251728    5/2005
(Continued)

OTHER PUBLICATIONS

Horowitz, Lauren, "digital wallet," Jun. 2011, whatis.techtarget.com, https://whatis.techtarget.com/definition/digital-wallet (Year: 2011).*
(Continued)

*Primary Examiner* — Resha Desai
*Assistant Examiner* — Michelle E Carey
(74) *Attorney, Agent, or Firm* — Norton Rose Fulbright US LLP

(57) ABSTRACT

There are described herein methods and systems for managing access rights to events. The access rights are allocated through a two-step process, whereby a first step comprises a real-time bidding procedure and a second step comprises a real-time seat allocation procedure. The system grants to users of successful bids an access right and an opportunity to select a seat for the event in accordance with a priority level associated with the successful bid. The priority level may be time related (selection of a seat before users having a lower priority level), seat-category related (selection of seats in a higher seat category than users having a lower priority level), or both, and is set in accordance with a monetary value associated with a given bid.

22 Claims, 5 Drawing Sheets

(56) References Cited

U.S. PATENT DOCUMENTS

| | | |
|---|---|---|
| 6,496,809 B1 | 12/2002 | Nakfoor |
| 7,003,485 B1 | 2/2006 | Young |
| 7,093,130 B1 | 8/2006 | Kobayashi et al. |
| 7,720,746 B2 | 5/2010 | Brett |
| 7,742,996 B1 | 6/2010 | Kwan |
| 7,660,751 B2 | 9/2010 | Cella et al. |
| 8,131,572 B2 | 3/2012 | Nakfoor |
| 8,175,926 B1 | 5/2012 | Handel et al. |
| 8,326,696 B2 | 12/2012 | Goldstein |
| 8,401,923 B1 | 3/2013 | Lester et al. |
| 8,849,720 B2 | 9/2014 | Nestor et al. |
| 2002/0082969 A1 | 6/2002 | O'Keeffe et al. |
| 2002/0091555 A1 | 7/2002 | Leppink |
| 2002/0116343 A1 | 8/2002 | Nakamura et al. |
| 2002/0138751 A1 | 9/2002 | Dutta |
| 2003/0069827 A1 | 4/2003 | Gauthman et al. |
| 2003/0229790 A1 | 12/2003 | Russell |
| 2004/0073439 A1 | 4/2004 | Shuster |
| 2004/0006497 A1 | 8/2004 | Nestor et al. |
| 2004/0153374 A1 | 8/2004 | Nelson |
| 2005/0230468 A1 | 10/2005 | Roth |
| 2005/0240507 A1 | 10/2005 | Galen et al. |
| 2006/0015435 A1* | 1/2006 | Nathanson ............ G06Q 20/401 705/37 |
| 2006/0108418 A1 | 5/2006 | Rice |
| 2006/0173781 A1 | 8/2006 | Donner |
| 2007/0055554 A1 | 3/2007 | Sussman et al. |
| 2008/0162211 A1 | 7/2008 | Addington |
| 2008/0312938 A1 | 12/2008 | Toole et al. |
| 2009/0063207 A1 | 3/2009 | Brodzeller |
| 2009/0164635 A1* | 6/2009 | Denker ................ H04L 63/105 709/226 |
| 2010/0082491 A1 | 4/2010 | Rosenblatt et al. |
| 2010/0217679 A1 | 8/2010 | Eckstein |
| 2011/0087555 A1 | 4/2011 | Gray |
| 2011/0166950 A1 | 7/2011 | Goldstein et al. |
| 2011/0178827 A1 | 7/2011 | Orenstein |
| 2011/0238497 A1 | 9/2011 | Milne et al. |
| 2012/0047268 A1 | 2/2012 | Sussman et al. |
| 2012/0130853 A1* | 5/2012 | Petri ................... G06Q 30/0609 705/26.35 |
| 2012/0185394 A1 | 7/2012 | Gelfand et al. |
| 2013/0096961 A1 | 4/2013 | Owens et al. |
| 2013/0144664 A1 | 6/2013 | Cho |
| 2014/0052598 A1 | 2/2014 | Briem |
| 2014/0095227 A1 | 4/2014 | Parker et al. |
| 2014/0244321 A1 | 8/2014 | Matsui et al. |
| 2014/0279615 A1 | 9/2014 | Levin et al. |
| 2014/0289067 A1 | 9/2014 | Brett |
| 2014/0344153 A1* | 11/2014 | Raj ..................... G06Q 20/3821 705/44 |
| 2015/0006208 A1 | 1/2015 | Nestor et al. |
| 2015/0046202 A1 | 2/2015 | Hunt |
| 2017/0098337 A1* | 4/2017 | Galley ..................... G07C 9/29 |

FOREIGN PATENT DOCUMENTS

| | | |
|---|---|---|
| RU | 2370819 | 10/2009 |
| WO | 9960489 | 11/1999 |

OTHER PUBLICATIONS

SkyAuction.com/welcom.do, Oct. 31, 2007, retrieved from https://web.archive.org/web/20071031062723/http://www.skyauction.com/welcome.do (Year: 2007).*
Ticket Exchange FAQ's; ticketmaster; Dec. 31, 2013.
Twin Tickets; My Twin Tickets; Minnesota Twins; Dec. 31, 2013.
EBay; Ticket Reselling Policy; Dec. 31, 2013.
StubHub!; StubHub! Where fans buy and sell tickets; Dec. 31, 2013.
ITicketBox; iTicketBox, Sleek, intuitive, fast.; 2013.
Patent Cooperation Treaty, International Search Report and Written Opinion issued for PCT Application No. PCT/CA2016/050564, dated Jul. 29, 2016, 10 pages.

* cited by examiner

SYSTEM AND METHOD FOR MANAGING EVENT ACCESS RIGHTS

CROSS-REFERENCE TO RELATED APPLICATIONS

The present application is a US National Stage of International Application No. PCT/CA2016/050564, filed on May 19, 2016, which claims priority under 35 U.S.C. 119(e) of U.S. Provisional Patent Application No. 62/163,759, filed on May 19, 2015, the contents of which are hereby incorporated by reference.

TECHNICAL FIELD

The present disclosure relates to the field of managing electronic access rights to events.

BACKGROUND OF THE ART

Event attendees are typically required to purchase a ticket in order to enter the venue at which the event is held. The tickets can be obtained in different manners and it is usually desirable for attendees to purchase their tickets well in advance, especially for highly popular events. However, when purchasing the tickets, users typically have to pay a fixed price and may have a limited choice in terms of the seats that are available at the time their ticket is purchased. This may lead to reduced patron satisfaction.

There is therefore a need for an improved system and method for managing electronic access rights to events.

SUMMARY

There are described herein methods and systems for managing access rights to events. The access rights are allocated through a two-step process, whereby a first step comprises a real-time bidding procedure and a second step comprises a real-time seat allocation procedure. The system grants to users of successful bids an access right and an opportunity to select a seat for the event in accordance with a priority level associated with the successful bid. The priority level may be time related (selection of a seat before users having a lower priority level), seat-category related (selection of seats in a higher seat category than users having a lower priority level), or both, and is set in accordance with a monetary value associated with a given bid.

In accordance with a first broad aspect, there is provided a computer-implemented method for managing access rights to an event. The method comprises receiving real-time bidding data comprising bids for access rights to the event, each one of the bids having a monetary value associated therewith; selecting at least some of the bids as successful bids as a function of the monetary value; classifying the successful bids into groups, each one of the groups having a corresponding priority level for seat selection; associating successful bids to users; and selectively granting the users access to a seat selection platform as a function of the priority level associated with each group.

In some embodiments, receiving real-time bidding data comprises receiving bids for a selected seat category, and classifying the successful bids into groups comprises subdividing bids for each seat category into groups according to the monetary value associated with each bid, each group corresponding to a range of monetary values.

In some embodiments, selectively granting the users access to a seat selection platform comprises granting access to a higher priority level group before granting access to a lower priority level group.

In some embodiments, each priority level corresponds to a seat category, and wherein selectively granting the users access comprises granting access to seats in the seat category.

In some embodiments, selectively granting access comprises granting access to all users concurrently.

In some embodiments, the method further comprises accepting bids that are above a minimum bid value and rejecting bids below the minimum bid value.

In some embodiments, the method further comprises collecting payment data with the bidding data.

In some embodiments, the method further comprises setting an admission price of the event in real-time as a function of the received bids.

In some embodiments, the method further comprises tracking the bids in real-time and outputting a bidding recommendation in response to a request for the bidding recommendation.

In some embodiments, the method further comprises assigning bids within a predetermined threshold value from a cut-off monetary value for the successful bids to a waitlist, and selecting bids from the waitlist when any of the successful bids are cancelled.

In some embodiments, selectively granting the users access to a seat selection platform comprises activating a token associated with each one of the users of the successful bids; validating the token upon access to the seat selection platform; receiving seat selections from the users; uniquely assigning seats to the users; and providing the access rights to the event with the assigned seats.

In accordance with a second broad aspect, there is provided a system for managing access rights to an event. The system comprises a processing unit and a non-transitory memory communicatively coupled to the processing unit and comprising computer-readable program instructions. The instructions are executable by the processing unit for receiving real-time bidding data comprising bids for access rights to the event, each one of the bids having a monetary value associated therewith; selecting at least some of the bids as successful bids as a function of the monetary value; classifying the successful bids into groups, each one of the groups having a corresponding priority level for seat selection; associating successful bids to users; and selectively granting the users access to a seat selection platform as a function of the priority level associated with each group.

In some embodiments, receiving real-time bidding data comprises receiving bids for a selected seat category, and classifying the successful bids into groups comprises subdividing bids for each seat category into groups according to the monetary value associated with each bid, each group corresponding to a range of monetary values.

In some embodiments, selectively granting the users access to a seat selection platform comprises granting access to a higher priority level group before granting access to a lower priority level group.

In some embodiments, each priority level corresponds to a seat category, and wherein selectively granting the users access comprises granting access to seats in the seat category.

In some embodiments, selectively granting access comprises granting access to all users concurrently.

In some embodiments, the program instructions are further configured for accepting bids that are above a minimum bid value and rejecting bids below the minimum bid value.

In some embodiments, the program instructions are further configured for collecting payment data with the bidding data.

In some embodiments, the program instructions are further configured for setting an admission price of the event in real-time as a function of the received bids.

In some embodiments, the program instructions are further configured for tracking the bids in real-time and outputting a bidding recommendation in response to a request for the bidding recommendation.

In some embodiments, the program instructions are further configured for assigning bids within a predetermined threshold value from a cut-off monetary value for the successful bids to a waitlist, and selecting bids from the waitlist when any of the successful bids are cancelled.

In some embodiments, selectively granting the users access to a seat selection platform comprises activating a token associated with each one of the users of the successful bids; validating the token upon access to the seat selection platform; receiving seat selections from the users; uniquely assigning seats to the users; and providing the access rights to the event with the assigned seats.

In accordance with a third broad aspect, there is provided a computer readable medium having stored thereon program code executable by a processor for managing access rights to an event. The program code is executable for receiving real-time bidding data comprising bids for access rights to the event, each one of the bids having a monetary value associated therewith; selecting at least some of the bids as successful bids as a function of the monetary value; classifying the successful bids into groups, each one of the groups having a corresponding priority level for seat selection; associating successful bids to users; and selectively granting the users access to a seat selection platform as a function of the priority level associated with each group.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
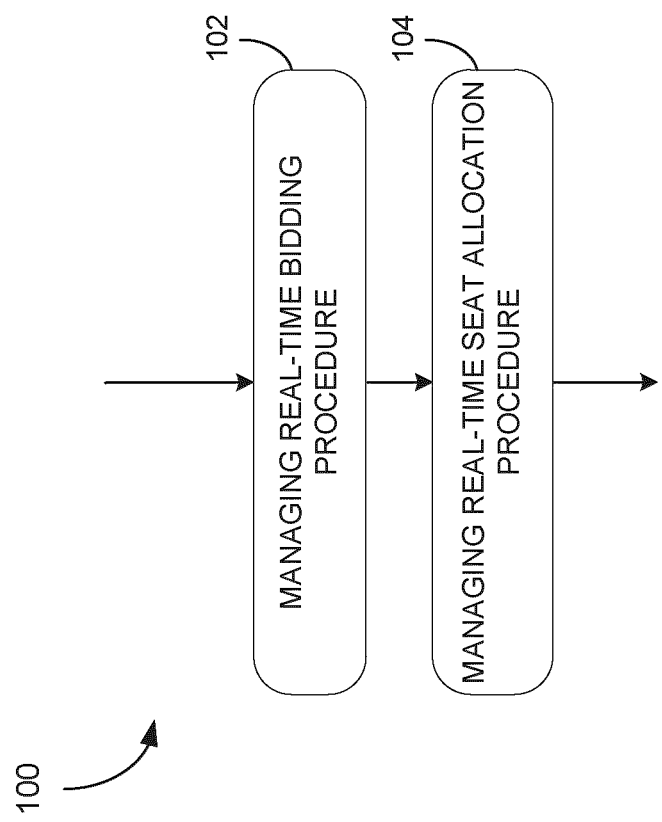
FIG. 1 is a flowchart of a method for securing admission to an event occurring at a venue, in accordance with an illustrative embodiment of the present invention.

Referring to FIG. 1, a method 100 for managing access rights to an event, in accordance with one embodiment, will now be described. The method 100 allows users to obtain, through an access rights managing platform associated with a venue or an event, access rights for upcoming events that are to occur at the venue. The event may be a live event, such as a live concert, a sports game, or the like. The venue may be held at a facility, such as a stadium/arena, a theater, a concert hall, or the like, where physical spaces, such as seats, are uniquely assigned to attendees. It should be understood that, for seat-less venues or events (e.g. outdoor festival shows) or the like where general admission or open seating is used, the physical spaces assigned to attendees may comprise sections of the venue (e.g. balcony or floor) rather than specific seats. Therefore, the expression "seat" is used herein to refer to a physical space or defined area at an event.

It should also be understood that, although the description below refers to an entertainment venue (e.g. a stadium/arena), other venues, such as convention centers may apply. Access to the venue is illustratively controlled by means of any type of access right, such as a ticket or any other proof of purchase, which may be electronic or physical, and indicates that one has paid for admission to an event occurring at the venue and which may further be used to assign a specific seat to a holder thereof. The attendee is typically expected to remain at his/her assigned seat during most of the event. As discussed above, in some venues, no seats will be assigned to attendees and the seat location indicia provided on the access right then indicates a section of the venue, rather than the specific physical location of a seat. In one embodiment, the access right is an electronic ticket that includes seat location indicia (e.g. row number and seat number) uniquely defining the physical location of the attendee's seat at the venue. In another embodiment, the user is provided with a proof of purchase associated with a unique profile of the user, as will be discussed further below. Admission to the venue can be controlled by verifying the user's profile information to confirm that the user has indeed acquired rights to one or more seats at the venue and thereby be admitted to the event.

The method 100 illustratively comprises, at step 102, managing a bidding procedure in real-time. During the bidding procedure, users place bids through the access rights management platform to acquire the right to select their seats in priority (e.g. before other users). A plurality of bidding mechanisms, including but not limited to Vickrey auction and Dutch auction, may apply. The method 100 further comprises at step 104 managing a seat allocation procedure in real-time to uniquely assign seats to the winner(s) of the bidding procedure performed at step 102. In one embodiment and as will be discussed further below, the seat allocation procedure is performed at step 104 regardless of the order in which bids have been placed and the bidding order may in some cases be rearranged to allocate seats in an efficient and speedy manner. This may be used, for example, when the volume of users wishing to attend a given event and concurrently bidding for seats for the event is high (e.g. thousands of users).

Figure 2:
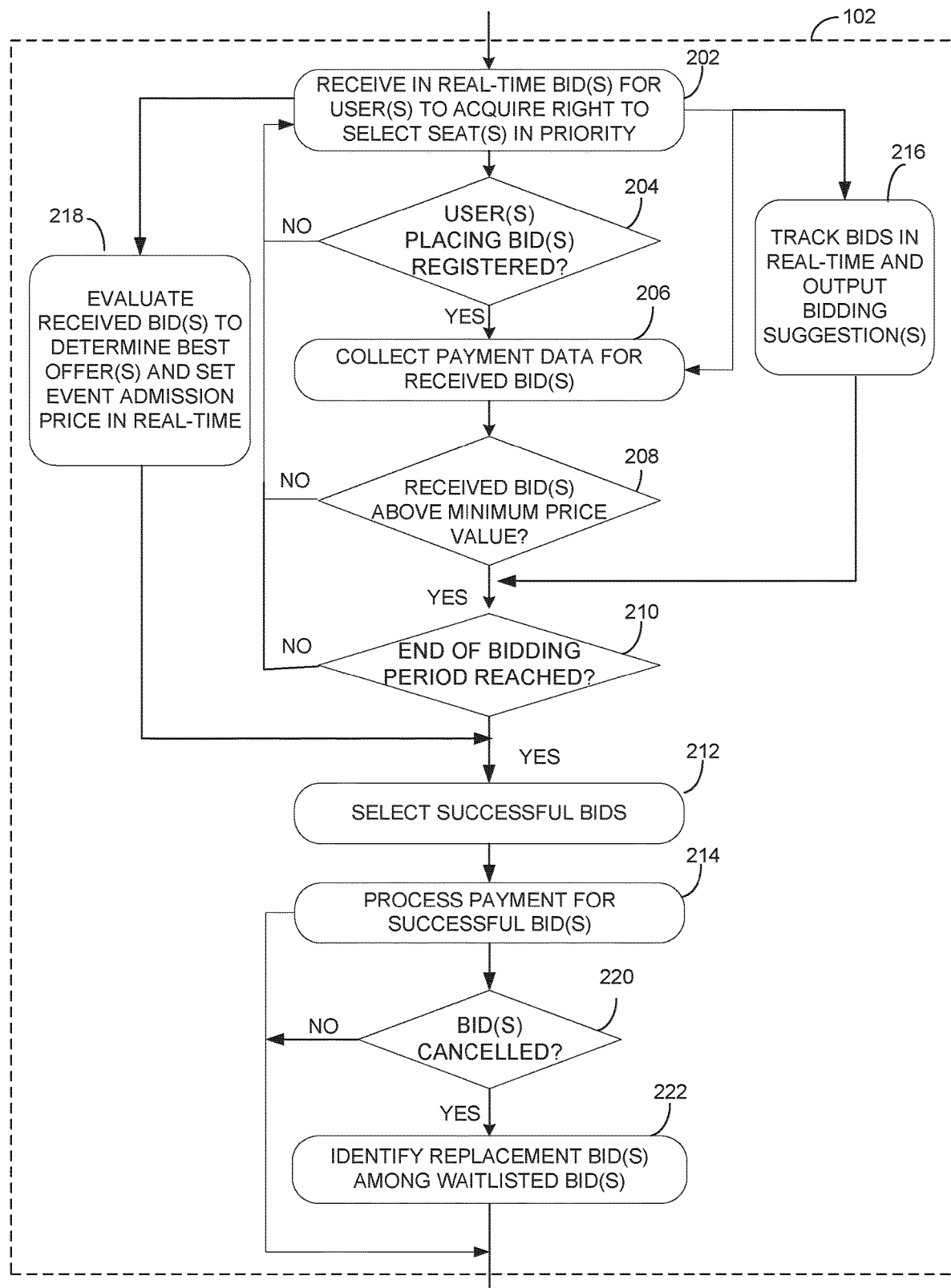
FIG. 2 is a flowchart of the step of FIG. 1 of performing a bidding procedure.

Referring now to FIG. 2, the step 102 of managing the real-time bidding procedure is presented as a method and comprises receiving in real-time at step 202 one or more bids from user(s) wishing to acquire a right to pre-select their seats in priority. The bids are illustratively placed once an event is announced and the bidding room is opened, and provide an indication of how much users are willing to pay for a seat at the event. In some embodiments, bids are received without any monetary value having been assigned to any of the seats for the event. For example, a concert for a given artist is announced for a specific date and the bidding is opened for a predetermined time period without setting any upper and/or lower monetary value limits for the bids.

As such, how much each bidder is willing to pay to (1) attend the event, and (2) obtain a priority seat selection will set the market value for the access right to the event. Alternatively, upper and/or lower monetary value limits may be set for a given event. For example, a minimum bid amount may be required in order to participate in the bidding procedure.

A given bid can be for one or more access rights with seat selection. In some embodiments, users may be offered the choice of automatically being allocated best available seats for a given seat category, provided they submit a winning bid. In such instances, a given bid can be for one or more access rights with best available seats. In some embodiments, users may be asked to pay a flat fee, separate from the bid amount, in order to make a seat selection instead of being automatically assigned best available seats. Note that even in such cases, the method 100 for managing access rights comprises the two steps illustrated in FIG. 1, namely the real-time bidding procedure 102 and the real-time seat allocation procedure 104. Indeed, the real-time seat allocation procedure 104 is performed once the bidding procedure 102 is completed.

Each bid received at step 202 has associated therewith a bidding value that is in turn linked to the seats (e.g. seat section or specific seats) that can be selected by the user having placed the bid (i.e. to the priority level or standing of right acquired through the bidding). Winning bids of higher value (e.g. above 500 dollars) give the users having placed the bids the right to select seats belonging to a different (e.g. higher) seat category than the seats that can be selected by users having placed winning bids of a lower value (e.g. below 500 dollars). A winning bid thus grants the user having placed the bid access to a seat pre-selection service that enables the user to choose his/her seat(s) in priority, in accordance with the bidding value associated with his/her bid. Alternatively, a winning bid grants the user having placed the bid one or more best available seats in priority in a seat category associated with his or her winning bid, such that upon winning, best available seats in the seat category are automatically assigned to the user of the winning bid without having to go through the seat pre-selection service. Also alternatively, or in combination therewith, a winning bid grants the user having placed the bid the right to select any seat in the venue, regardless of category, before users having placed winning bids of a lower value. For example, seat selection may be staggered in time over three different selection periods, such that each winning bid is associated with one of the three selection periods as a function of the monetary value of the bid. Other factors may also be used to associate the winning bid with a time period for seat selection.

In some embodiments, upon accessing the seat pre-selection service, users may enter a virtual seat selection room where users can view available seats that meet restrictions (if any) related to their bidding and are provided precedence to freely select one or more seats among these available seats. The virtual selection room may be implemented through an interactive user interface. Successful (or winning) bidders can use the seat pre-selection service and enter the virtual seat selection room to select their seats before users who lost their bids can make their seat selection. Winning bidders can also use the seat pre-selection service to select their seats before other winning bidders who placed bids of a lower value (and therefore acquired a lower seat pre-selection right), or have access to seats of a higher category than other winning bidders who placed bids of a lower value.

Step 202 may further comprise receiving a bidding confirmation from the user(s) having placed the bid(s). The confirmation may be received by any suitable means, such as by users selecting a corresponding option presented on a user interface. Any suitable identification technique (e.g. authentication of a digital fingerprint presented on the user's mobile device), may also be used to identify the bidder(s) and receive their bidding confirmation.

After bids (and the confirmation thereof) have been received at step 202, the next step 204 may then be to assess whether the user(s) having placed the bid(s) are registered users. It should be understood that, in some embodiments, only registered users may be allowed to place bids at step 202 and step 204 may therefore not be performed as it may already be determined, upon receiving the bids at step 202, that the users are registered users authorized to place the bids. In embodiments where all users, registered or not, are allowed to place bids, step 204 may be performed by comparing, for each bidding user, an identifier (e.g. username and/or password) received from the user upon receipt of his/her bid to an identifier retrieved from memory. If both identifiers match, the bidding user is successfully authenticated and it is determined at step 204 that the user is a registered user. The next step 206 may then be to collect payment data for each one of the bids received at step 202. This may be achieved using payment information provided by the bidding user(s) at step 202, along with their bids. It should be understood that the payment data may also be retrieved from memory (e.g. obtained from the user's profile information, discussed further below). In some embodiments, pre-authorization of payment is obtained with the payment data. Alternatively, payment data is collected for later use without the need for a pre-authorization. This embodiment may be favored in instances where the bidding process is long and it may not be practical to hold large amounts on users' credit cards. In other embodiments, payment data is only collected later in the process, for example once the bid has been deemed successful.

The payment data may comprise a payment amount and in some cases a method of payment. The data related to the method of payment may comprise credit card information, financial account information, account debit authorization information, electronic funds transfer information, or the like. The payment data may also comprise a stored payment value that is associated with the user's profile and that indicates that funds are associated with the user's profile. For example, funds (e.g. $100) may be associated with a user's profile after a user attends a predetermined number (e.g. five (5)) of events at the venue. The payment amount may comprise a face value for the access right (e.g. $250) and a predetermined premium amount (e.g. $50) that the user is willing to pay to acquire the right to be granted access to the seat pre-selection service. The face value and the premium amount may be set by an issuer of the access right, e.g. a primary market seller (e.g. a ticket sales and distribution company), an event producer (e.g. venue management or sports team), or the like. It should be understood that, after performing step 206, payment will only be processed (e.g. by charging a credit card, financial account, or the like, of the user) for successful bids.

At step 208, it may then be assessed whether the received bid(s) are above a minimum price value, e.g. a standing minimum bid for the particular seat section requested by a bidder, as established by an issuer of the access right for example. Note that step 208 may also be performed earlier in the method 102, such as concurrently with step 202 or immediately thereafter. In some embodiments, for example when no minimum price value is in place, step 208 may be omitted. When the received bids are confirmed to be above the minimum price value, the next step 210 may be to determine whether the bidding period has ended. It should be understood that, in some embodiments, bids may only be received for a predetermined period of time and the bidding period may end at a pre-determined date and/or time (e.g. forty-eight (48) hours after the on-sale date/time). If it is determined at step 210 that the end of the bidding period has been reached, the bidding is closed and the received bid(s) are evaluated. At step 212 successful bidder(s) are identified and notified, e.g. by outputting a corresponding message for transmission to each successful bidder(s). In one embodiment, bids are evaluated at step 212 by associating a rank or standing with each bid received at step 202, thereby providing an ordering of received bids. Whenever a higher standing bid is received, lower standing bid(s) are removed from the order (or "bumped"), unless additional seats are available for selection. Note that in such an embodiment, step 212 may be performed concurrently with steps 202 to 210. In some embodiments, when equal bids are made, the earlier one of the equal bids may have precedence. Other factors may also be used to select from equal bids when the number of equal bids exceeds the number of available seats.

Referring to Table 1, there is illustrated an example where five (5) different bids are received at step 202 at five (5) different times. The bids may be received from five (5) registered users who each placed a bid to obtain an access right to a given event. In some embodiments, the access right is associated with a priority seat selection in a specific category of seats. In other embodiments, the access right is associated with a priority seat selection for all seats of the event. The first bid has a value of $500, the second bid has a value of $750, the third bid has a value of $300, the fourth bid has a value of $305, and the fifth bid has a value of $210. Upon evaluating the bids at step 212, it may be determined that the first four (4) bidders, i.e. those who placed the higher bids (or whose bid was above a predetermined bidding value, e.g. $250), won an access right to the event with an associated seat selection priority or best available seats, depending on the request in each case.

TABLE 1

| BIDDING ORDER | AMOUNT | REQUEST | OUTCOME |
|---|---|---|---|
| 1 | 500$ | SEAT SELECTION | ACCESS RIGHT GRANTED WITH PRIORITY SEAT SELECTION |
| 2 | 750$ | BEST AVAILABLE SEATS | ACCESS RIGHT GRANTED WITH BEST AVAILABLE SEATS |
| 3 | 300$ | SEAT SELECTION | ACCESS RIGHT GRANTED WITH PRIORITY SEAT SELECTION |
| 4 | 305$ | SEAT SELECTION | ACCESS RIGHT GRANTED WITH PRIORITY SEAT SELECTION |
| 5 | 210$ | BEST AVAILABLE SEATS | ACCESS RIGHT DENIED |

In one embodiment, the event admission price may be set in real-time at step 218 by resetting the minimum price value to the maximum bid received. For example, and referring again to Table 1, it may be determined, based on the five received bids, that the event price will be set to a minimum of 400$, and bids 3, 4, and 5 will be rejected. As illustrated, step 218 is performed concurrently with the bidding, and every time a new bid is received the minimum price value is re-evaluated as a function of the total bids received. Alternatively, step 218 may be performed after the initial bidding period has ended and the bidding period may be extended if there are remaining places for the event. In some embodiments, step 218 comprises determining the monetary values associated with each priority level as the bids are received. In some embodiments, step 218 is performed only after steps 204, 206, and 208 are performed, such that bids that are taken into consideration for step 218 are qualified bids, i.e. they are received from registered users, are above a minimum price value, and are accompanied by payment data.

If it is determined at step 204 that the user(s) having placed the bid(s) are not registered users, if it has been determined at step 208 that the bid(s) received at step 202 are not above the minimum price value, or if it has been determined at step 210 that the end of the bidding period has not been reached, the method may flow back to step 202 of receiving new bid(s). Once the received bid(s) have been evaluated at step 212, payment processing for the successful bid(s) is finalized at step 214. For this purpose, a credit card, financial account, or the like, of the user may be charged.

In some embodiments, method 102 may also comprise step 216 of real-time tracking of bids received at step 202. The bids may be tracked by analyzing and correlating the bidding data received at step 202 in real-time. Analysis results may be stored in memory along with the received bidding data. By tracking the bidding data, it may then be possible to provide bidding suggestion(s), which can be output to the users. For example, by processing the bidding data received at step 202, it becomes possible to assess the number of users currently placing bids, the average value of the bids, the number of bids over a given value that have been received over a predetermined time period, and the like. Bidding suggestions, including, but not limited to, the likelihood that a given bid will be successful or the bidding value required to win a bid, may then be output at step 216. In some embodiments, step 216 is performed only after steps 204, 206, and 208 are performed, such that bids that are taken into consideration for step 216 are qualified bids, i.e. they are received from registered users, are above a minimum price value, and are accompanied by payment data.

In some embodiments, unsuccessful bids may also be tracked, as determined further to the evaluation step 212, and the information may be stored in memory. In particular, information about one or more bids that were close to (e.g. within a predetermined threshold) making the best offers may be held in memory, e.g. waitlisted, so that the waitlisted bidders may be offered seats, e.g. in the event one or more successful bidders end up cancelling their bid or access right at a later time. The waitlisted bidding information stored in memory may be ranked, e.g. by order of bidding value. It may then be determined at step 220 whether one or more bids were cancelled. If this is not the case, method 102 may end. Otherwise, replacement bid(s) may be identified among the waitlisted bid(s) at step 222. For this purpose, the memory may be queried to identify as replacement bids top bids among the waitlisted bids. For example, if three (3) successful bids have not been confirmed or have been cancelled, step 222 may comprise identifying the top three (3) bids among the waitlisted bids. The bidders having placed the replacement bids may then be notified that one or more seats are now available for selection.

In one embodiment, when alternate dates are available for an event, the users who placed the bids that were close to making the best offers for a given event date may be provided with seat(s) for the alternate event date. This may occur automatically, without the users having to place new bids for the alternate date. A message to this effect may be sent to the users.

In some embodiments, users may select an option allowing their bids to be automatically raised by a predetermined amount, up to a predetermined limit, so as to ensure that the bid is above the minimum price value. The predetermined limit is set by the user, and the predetermined amount may be set by the user or defined by the system. For example, if a bid is placed at 100$ for an event not yet having a minimum bid value set, and the minimum bid value is eventually set to 150$, the user's bid may automatically be raised to 150$ if this option has been selected by the user and the user has set his limit to 150$ or more. If the user has set his limit to 125$, then the bid would not be raised as the limit is lower than the minimum bid value. This feature may also be provided for qualifying for a priority level. For example, a user may set his limit and associate the bid to a given seat category. If the cut-off for the seat category is set dynamically to a value that is above the bid, but the user has set a limit above the cut-off, then the bid may be automatically increased to the cut-off. Other embodiments of this feature, whereby a user's bid may automatically be raised in accordance with certain predetermined settings, may also be provided.

Figure 3:
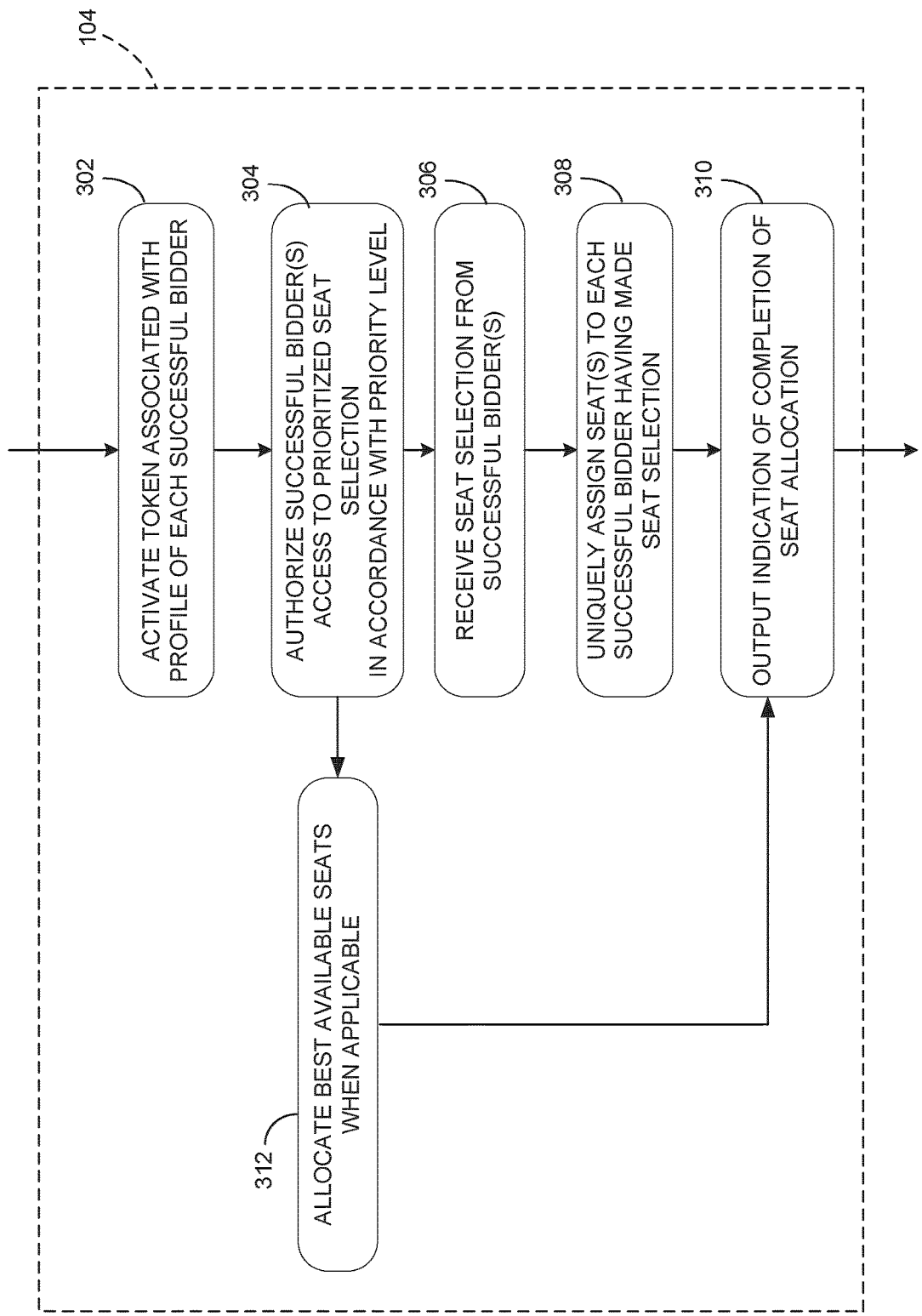
FIG. 3 is a flowchart of the step of FIG. 1 of performing a seat allocation procedure.

Referring now to FIG. 3, step 104 of managing a real-time seat allocation procedure is presented as a method that illustratively comprises activating, at step 302, a unique encrypted token associated with a profile of each winning bidder. Activation of the token indicates that the user's bid, as well as the bidding category (e.g. seat section—if applicable) in which the user placed his/her bid, have been recognized as valid. Each token is activated in accordance with restrictions related to the user's bidding. For example, depending on the value associated with their bid, a given user may only be allowed to select seats of a given price value and/or located within a given section of the venue. The next step 304 may then be to authorize winning or successful bidder(s) (as identified at step 212 and/or 220 of FIG. 2) to gain access to prioritized seat selection, e.g. access a seat pre-selection service and enter a virtual seat selection room, as discussed above. In one embodiment, the authorization may be provided by issuing a unique access code to winning bidders, the access code allowing the bidders to access the seat pre-selection service and select their seats. In another embodiment, no access code may be provided and users may be authenticated upon attempting to access the virtual seat selection room. The authentication may be performed by retrieving information (e.g. token activation information) from each user's profile to confirm that the user attempting to access the virtual seat selection room is indeed among the successful bidders and is therefore authorized access to the prioritized seat selection service. If the user is not authenticated, access to the virtual seat selection room may be denied and a message to this effect output to the user.

In one embodiment, at step 304, winning bidders are prompted to select their seats according to priorities. In this manner, according to the proposed method, a first group of bidders, i.e. those whose bids were successful, is first created and this group is then partitioned (or classified) into sub-groups in accordance with priority levels, i.e. groups for seat selection. For example, bidders having placed the top 10% of bids may be authorized to access seat selection first (first sub-group having a first priority level associated therewith), followed a predetermined period of time (e.g. an hour) later by the next top 10% bidders (second sub-group having a second priority level associated therewith), etc., thereby creating seat selection sub-groups for every 10% bidders.

In another embodiment, the sub-groups may be created for every 10% bidders but each sub-group may also include a predetermined number of winning bidders that are the closest (e.g. by at least 3%) to making the group in question. For example, if bids of $1,000, $900, $800, $797, and $700 have been received, sub-groups created for every 10% bidders would comprise a first sub-group with the $1,000 bid, a second sub-group with the $900 bid, a third sub-group with the $800 and $797 bids, and a fourth sub-group with the $700 bid. Other embodiments may apply.

At step 304, specific ones of the winning bidders (e.g. fans of a given artist or members of a given loyalty program) may also be prompted to select their seats among one or more blocks of reserved seats, which may be linked to an application programming interface (API) to validate that only the specific users can access seats from the reserved blocks(s). It should also be understood that specific groups of users may be authorized to proceed with complete transactions (e.g. acquire legitimate or "active" rights to select seat(s) in the virtual seat selection room, select the seat(s), and purchase tickets at a price that may be predetermined) without having to place bids beforehand. In some embodiments, specific restrictions may be placed on these seats, namely with regards to transferring or selling the access rights to other, non-authorized individuals.

In one embodiment, winning bidder(s) can access the pre-selection service to select their seats in priority, i.e. before any other user, regardless of the order in which the winning bids have been placed. Using the example from Table 1, where five bidders have each placed a bid for a seat in section A with respective bidding values of $500, $750, $300, $305, and $210, all four (4) winning bidders may be authorized to access the seat pre-selection service at the same time (e.g. as of 9:00 AM). Each winning bidder may then access the service and choose his/her seat(s) when convenient for them. As a result, if the fourth bidder (who placed a bid of $305) accesses the seat pre-selection service before the first bidder (who placed a bid of $500), e.g. the fourth bidder accesses the service at 9:03 AM while the first bidder accesses the service at 9:10 AM, the fourth bidder may make his/her seat selection first even though he/she placed a lower bid than the first bidder. The first bidder may then be left with a reduced number of seats to choose from upon accessing the seat pre-selection service.

In another embodiment, illustrated in Table 2, the users having bet $500 and $750 may be authorized to access the seat pre-selection service at a first time (e.g. as of 9:00 AM), corresponding to a first priority level, while the users having bet $300 and $305 may be authorized to access the seat pre-selection service at a second time (e.g. as of 10:00 AM), corresponding to a second priority level.

TABLE 2

| BIDDING ORDER | AMOUNT | PRIORITY LEVEL |
| --- | --- | --- |
| 1 | 500$ | 1 |
| 2 | 750$ | 1 |
| 3 | 300$ | 2 |
| 4 | 305$ | 2 |
| 5 | 210$ | NONE |

Still in another embodiment, a predetermined number of users having placed their bids first (e.g. the first thousand (1000) bidders) may all be granted access to the seat pre-selection service at the same time, and provided with the same opportunity to select their seats. In this case, these users would all have an equal chance to select their desired seats, regardless of the order in which the users placed their bids. It can therefore be seen that the bidding order can be lost upon access to the seat pre-selection service being granted and seat selection being made.

In order to counter the loss of the bidding order, seats may be locked (i.e. secured) for specific winning bidder(s) for a predetermined period of time, regardless of any subsequent bids for the seats. For example, seats may be locked for a user who placed a bid above a predetermined value or whose bid was above another user's bid by a given threshold (e.g. 10%). Seats may also be locked for seasoned ticket holders. The seats may be locked until the user accesses the seat pre-selection service and selects his/her seats among the locked seats. The seats to be locked may be determined in accordance with the user's preferences (as obtained from the user's profile information, discussed further below). In another embodiment, the seats to be locked may be determined in accordance with historical data, e.g. data indicating which seats have been considered as the most desirable by previous attendees of the venue. Other embodiments may apply.

The next step 306 may then be to receive a seat selection from the successful bidder(s). The seat selection data received at step 306 provides the location of the seat(s) (e.g. seat number(s)) selected by the user upon the user entering the virtual seat selection room. At step 308, the seat(s) selected by the winning bidder(s) may then be uniquely assigned to the user and associated with their profile, provided these seats meet the restrictions related to the user's bidding. In one embodiment, seat(s) are assigned in accordance with the order in which the seat selection is received from the successful bidders, i.e. the first user that confirmed their seat selection is assigned his/her seat(s) first. If the selected seats do not meet the restrictions, the user may be presented with alternative seat options from which to choose. Alternatively, an alternate seat meeting the restrictions may be automatically selected for the user who may, as a result, be moved to another seat section than the seat section the user initially selected. An indication (e.g. a visual confirmation) of completion of the seat allocation may also be output at step 310.

In some embodiments, each bid is made for a given seat category. For example, there may be three categories of seats and when making a bid, the user selects to which category his or her bid is to be applied. In some embodiments, each category is defined by minimum and/or maximum bid values. Alternatively, no minimum and/or maximum bid values are assigned to the categories and users are free to bid as they wish for a priority selection of a seat in a given category. As such, a bid made in a lower category may have a higher monetary value than a bid placed in a higher category. This does not grant the user of the bid the opportunity to select in the first category, but rather increases the chances of the higher bid in the lower category being successful. An example is illustrated in Table 3.

TABLE 3

| SEAT CATEGORY | BID AMOUNT | OUTCOME |
| --- | --- | --- |
| 1 | 500$ | SEAT SELECTION PRIORITY GRANTED |

TABLE 3-continued

| SEAT CATEGORY | BID AMOUNT | OUTCOME |
| --- | --- | --- |
| 1 | 750$ | SEAT SELECTION PRIORITY GRANTED |
| 1 | 300$ | SEAT SELECTION PRIORITY DENIED |
| 2 | 400$ | SEAT SELECTION PRIORITY DENIED |
| 2 | 450$ | SEAT SELECTION PRIORITY GRANTED |
| 2 | 600$ | SEAT SELECTION PRIORITY GRANTED |
| 3 | 100$ | SEAT SELECTION PRIORITY DENIED |
| 3 | 150$ | SEAT SELECTION PRIORITY GRANTED |
| 3 | 210$ | SEAT SELECTION PRIORITY GRANTED |

In the example of Table 3, there are two seats available per category. Therefore, the two highest bids per category are granted an access right with a seat selection priority. In some embodiments, a winning bid in a given category will result in being denied an access right. Alternatively, or in combination thereof, a losing bid in a category may result in being granted an access right with a seat selection priority in a lower category. For example, in Table 3, the 400$ bid in the second category is unsuccessful, but may be allocated a seat in the third category. If the number of seats are fixed, then lowest winning bid in the third category may become a losing bid, in this case the 150$ bid.

In some embodiments, access to the virtual seat selection room is granted concurrently for all categories. In other words, the winning bidders of all categories may enter the virtual seat selection room at the same time, and be allowed to select a seat from the category associated with the winning bid. Using the example from Table 3, at 9:00 am, all users may enter the virtual seat selection room. The users of the 500$ and 750$ bids make their selection from seats of the first category, while the users of the 450$ and 600$ bids make their selection from seats of the second category. Alternatively, when no categories are associated with each bid, seat selection is staggered over time by sub-dividing the winning bids into groups, as described above. Also alternatively, or in combination therewith, winning bids of a given category are further sub-divided into groups, and access of each group is staggered over time. For example, the user of the 750$ bid may be allowed access to the virtual seat selection room for seats in the first category fifteen minutes before the user of the 500$ bid.

In some embodiments, a step 312 of allocating best available seats is performed once successful bidders are provided access to prioritized seat selection, as per step 304. Winning bids for best available seats are also uniquely assigned seats which are provided to users with the access rights. In some embodiments, one or more factors may be used to select the uniquely assigned seats for best available seats, such as for example user preferences.

Figure 4:
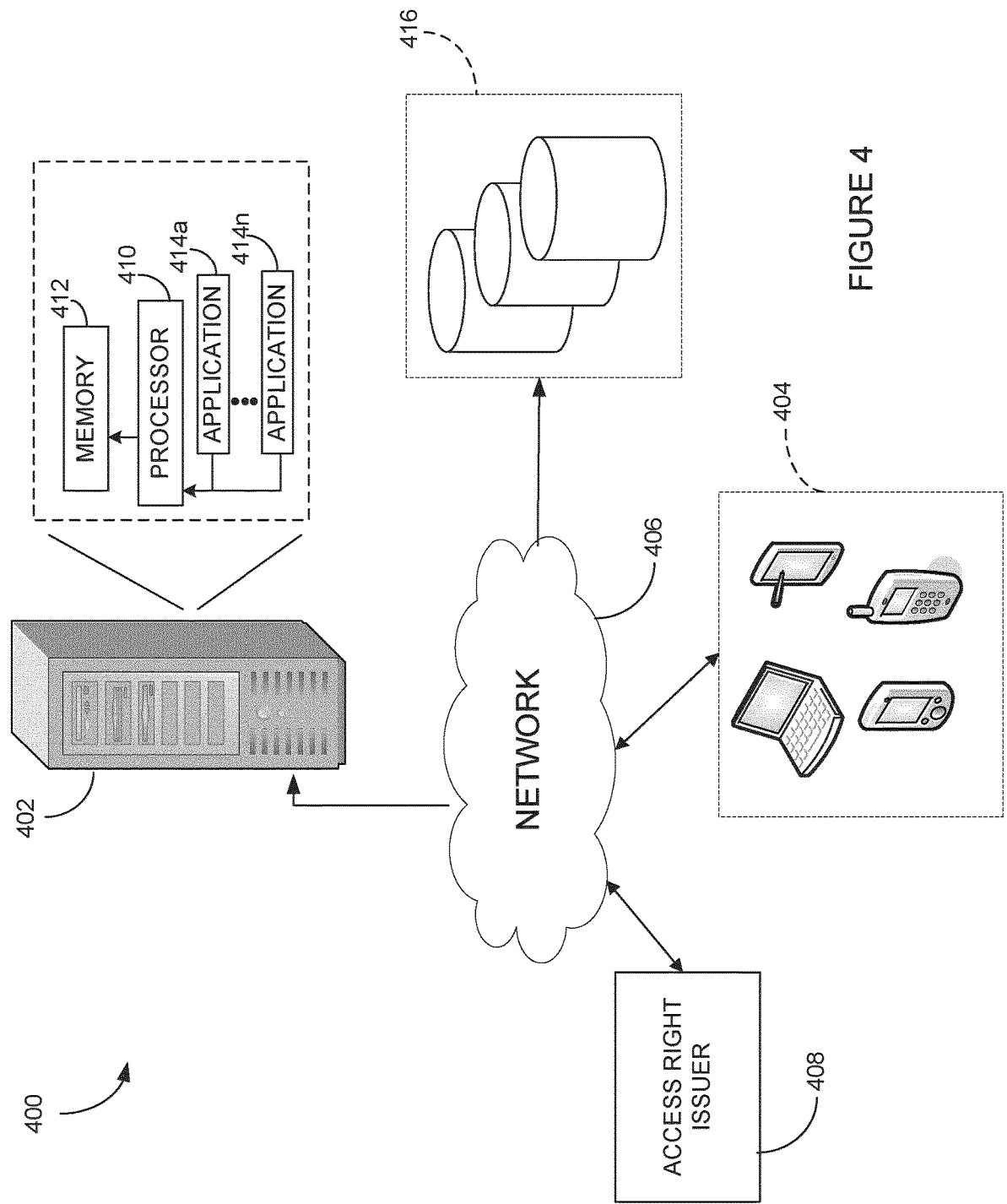
FIG. 4 is a schematic diagram of a system for securing admission to an event occurring at a venue, in accordance with an illustrative embodiment of the present invention.

Referring now to FIG. 4, a system 400 for securing admission to an event occurring at a venue, in accordance with one embodiment, will now be described. The system 400 may comprise one or more server(s) 402 adapted to communicate with a plurality of mobile devices 404 via a network 406, such as the Internet, a cellular network, Wi-Fi, or others known to those skilled in the art. As will be discussed further below, the devices 404 may provide users access to the system 400 for securing admission to events occurring at the venue. The devices 404 may comprise any device, such as a laptop computer, a personal digital assistant (PDA), a tablet, a smartphone, or the like, adapted to communicate over the network 406.

In one embodiment, the system 400 requires users to log in or otherwise gain authorized access to the system 400 through the use of a unique identifier. For this purpose, users illustratively register with the system 400 by completing an application, thereby creating a unique profile or account that may be stored in the memory 412 and/or databases 416. This may be done by accessing a website associated with the system 400 using the user's device 404. Once registration is complete, each user is illustratively provided with a unique identifier that may be encrypted using any encryption method, such as an email address, a username, and/or a password, associated with his/her profile. The identifier may be used to verify the identity of the user upon the user attempting to access the system 400. For example, the unique identifier may be compared to a government database or another source of data used for identification purposes. In some embodiments, the unique identifier is a mobile phone number and is compared to a list of authorized and/or unauthorized mobile phone numbers, for security purposes. Other security measures may also be applied to verify the identity of the user. Access to the system 400 may then be effected by the user logging on to the website with the identifier. Alternatively, the system 400 may be installed on the device 404 as a software application, which may be launched by the user on the device 404. It should be understood that the system 400 may be accessed by multiple users simultaneously. It should also be understood that a given user may log into the system 400 using an identifier associated with an online social network or social networking application (e.g. Facebook™, Google+™, Twitter™ or the like) to which the user has subscribed.

In one embodiment, an electronic wallet containing payment information, digital coupons, a history of used access rights, active access rights for future events, and other relevant information, may be associated with each user profile. The electronic wallet may also comprise a photograph of the user that can be used, for instance, for facial recognition purposes during an ID validation step. The system 400 may also associate the user's profile with a unique encrypted token that is temporary and representative of a proof of purchase (e.g. of an access right purchased by the user). The token may contain information, such as the price value associated with the purchased access right as well as other relevant information (e.g. seat number, identification of the venue, identification of the event, etc.) identifying the venue and/or event. It should be understood that, since a given user may purchase multiple access rights, a given user profile may hold multiple tokens, e.g. having different price values.

The server 402 may further be accessed by an access right issuer 408. In one embodiment, the access right issuer 408 provides the server 402 with pricing information for the access rights, e.g. a minimum price value for each category of access right. The access right issuer may also provide other relevant information, including, but not limited to, a seating map or layout, seat sections, standing access right details, and the like.

The server 402 may comprise a series of servers corresponding to a web server, an application server, and a database server. These servers are all represented by server 402 in FIG. 4. The server 402 may comprise, amongst other things, a processor 410 coupled to a memory 412 and having a plurality of applications 414a, . . . , 414n running thereon.

The processor 410 may access the memory 412 to retrieve data. The processor 410 may be any device that can perform operations on data. Examples are a central processing unit (CPU), a microprocessor, and a front-end processor. The applications 414a, . . . , 414n are coupled to the processor 410 and configured to perform various tasks as explained below in more detail. It should be understood that while the applications 414a, . . . , 414n presented herein are illustrated and described as separate entities, they may be combined or separated in a variety of ways. It should be understood that an operating system (not shown) may be used as an intermediary between the processor 410 and the applications 414a, . . . , 414n.

The memory 412 accessible by the processor 410 may receive and store data. The memory 412 may be a main memory, such as a high speed Random Access Memory (RAM), or an auxiliary storage unit, such as a hard disk or flash memory. The memory 412 may be any other type of memory, such as a Read-Only Memory (ROM), Erasable Programmable Read-Only Memory (EPROM), or optical storage media such as a videodisc and a compact disc. Also, although the system 400 is described herein as comprising the processor 410 having the applications 414a, . . . , 414n running thereon, it should be understood that cloud computing may also be used. As such, the memory 412 may comprise cloud storage.

One or more databases 416 may be integrated directly into the memory 412 or may be provided separately therefrom and remotely from the server 402 (as illustrated). In the case of a remote access to the databases 416, access may occur via any type of network 406, as indicated above. The databases 416 described herein may be provided as collections of data or information organized for rapid search and retrieval by a computer. The databases 416 may be structured to facilitate storage, retrieval, modification, and deletion of data in conjunction with various data-processing operations. The databases 416 may consist of a file or sets of files that can be broken down into records, each of which consists of one or more fields. Database information may be retrieved through queries using keywords and sorting commands, in order to rapidly search, rearrange, group, and select the field. The databases 416 may be any organization of data on a data storage medium, such as one or more servers. As discussed above, the system 400 may use cloud computing and it should therefore be understood that the databases 416 may comprise cloud storage.

In one embodiment, the databases 416 are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). Identity verification of a user may be performed using usernames and passwords for all users. Various levels of access authorizations may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

Figure 5:
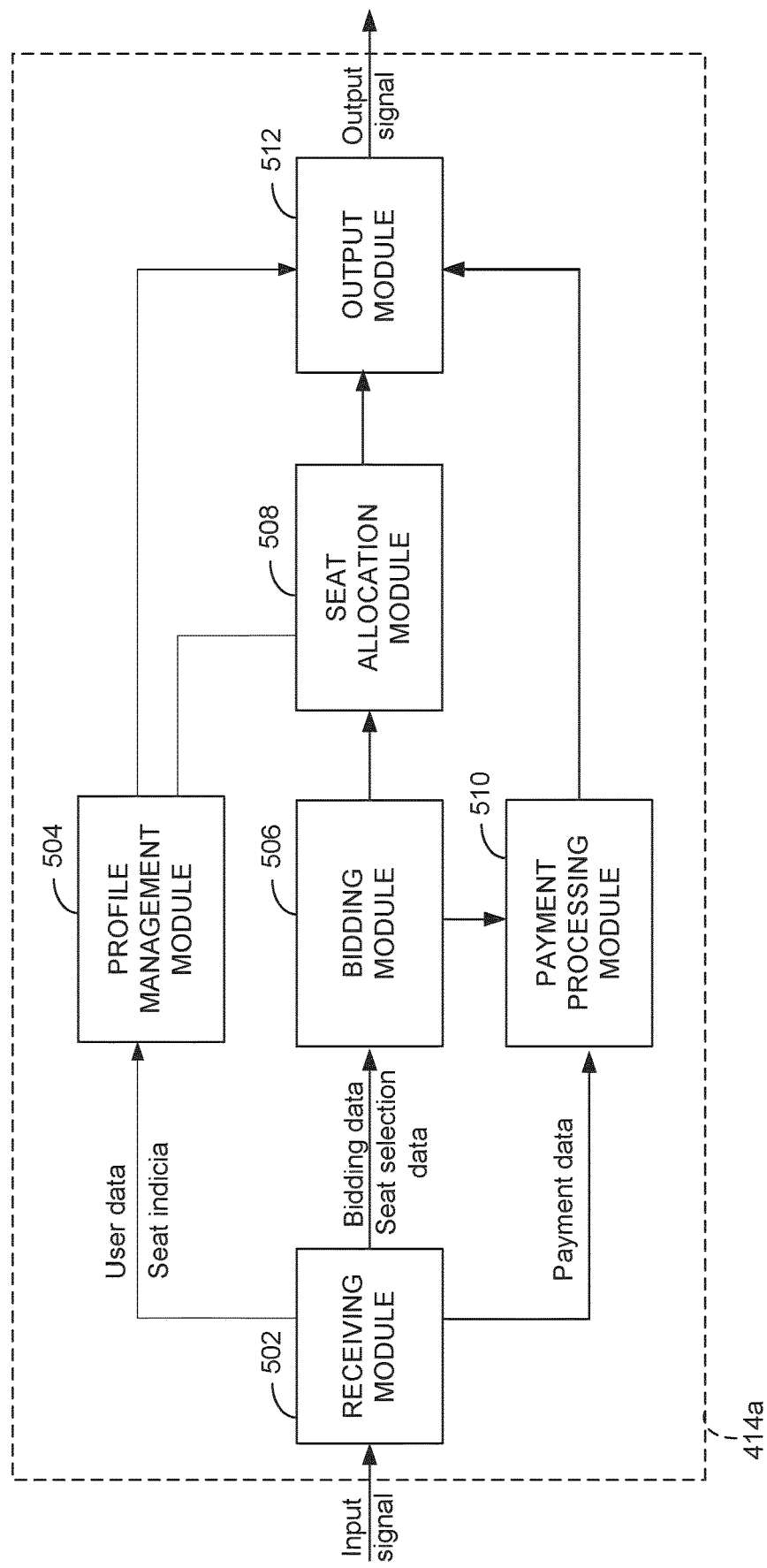
FIG. 5 is a schematic diagram of an application running on the processor of FIG. 4.

FIG. 5 is an exemplary embodiment of an application 414a running on the processor 410 of FIG. 4. The application 414a illustratively comprises a receiving module 502, a profile management module 504, a bidding module 506, a seat allocation module 508, a payment processing module 510, and an output module 512.

The receiving module 502 illustratively receives one or more input signals from one or more device(s) 404 and/or the access right issuer 408. The input signal(s) received from each device 404 may comprise data uniquely identifying the user, e.g. the user's identifier associated with his/her account in the system 400. The user identifier may indeed be received upon the user attempting to gain access to the system 400 for securing admission for an event. The user identifier may then be sent by the receiving module 502 to the profile management module 504 for authenticating the user prior to providing the user access to functionalities of the system 400. The profile management module 504 may, upon receiving the user identifier, retrieve from the memory 412 and/or databases 416 a stored user identifier associated with the user's account. The profile management module 504 may be configured to determine if there are any restrictions on the user or on the user's access to the system 400. The profile management module 504 may then compare the retrieved user identifier and the user identifier received from the receiving module 502. If both identifiers match, the profile management module 504 successfully authenticates the user and generates a message to that effect. Otherwise, if the identifiers do not match, the profile management module 504 determines that the user attempting to access the system 400 should not be authorized to do so and a message to that effect is generated. The message output by the profile management module 504 is then sent to the output module 512 for rendering on a suitable output device, e.g. a screen, provided with the device 404. The output module 512 may transmit data to the device 404 through instant push notifications sent via the network 406. Email, Short Message Service (SMS), Multimedia Messaging Service (MMS), instant messaging (IM), or other suitable communication means known to those skilled in the art may also apply.

The input signal(s) received from a device 404 may also comprise bidding data and seat selection data. The bidding data and/or seat selection data may uniquely identify a location of a seat or section of the venue for which the user wishes to obtain an access right. The bidding data and seat selection data may then be sent by the receiving module 502 to the bidding module 506, which is illustratively configured to implement the steps of the real-time bidding procedure discussed above with reference to FIG. 2. After performing the bidding procedure, i.e. after the received bids have been evaluated and the best offers determined, the seat allocation module 508 may be used to perform the steps of the real-time seat allocation procedure discussed above with reference to FIG. 3. In performing the seat allocation procedure, the seat allocation module 508 may retrieve venue data, e.g. a physical layout or seating chart of the venue, from the memory 412 and/or databases 416 for rendering to the users via the output module 512, thereby facilitating a user's viewing and selection of available seats. Once the seat allocation procedure has been performed by the seat allocation module 508, the bidding data and the seat selection data may be sent to the profile management module 504 so the data can be associated with the user's profile stored in the memory 412 and/or the databases 416. The seat allocation module 508 may output the outcome of the seat allocation procedure to the output module 512 for presentation of the information to the users (e.g. rendering on a suitable output device provided with the user's device 404 or transmission to the device 404 through a suitable communication means, as discussed above). For example, the output module 512 may present to the users (e.g. all users or the winning bidders only) an indication of completion of the seat allocation procedure, confirming that the bidding has been won and that the desired seat(s) have been selected.

While the bidding procedure is being performed at the bidding module 506, payment data may be received at the receiving module 502 along with the received bids. The payment data may comprise credit card information, financial account numbers, account debit authorizations, electronic funds transfer information, and other relevant payment information known to those skilled in the art. When payment data is received, the receiving module 402 transmits the payment data to the payment processing module 510, which processes the data to proceed with the payment. In particular, the payment processing module 510 may charge a credit card or financial account of the patron as per the payment data. Payment data may alternatively be received directly from the profile management module 504. This may for example be the case when the patron chooses to use stored information, e.g. credit card information, provided in his/her profile to proceed with the payment rather than entering his/her payment information. The patron may also choose to use a stored payment value associated with his/her profile. As such, the payment information may be retrieved from the patron's profile and sent directly to the payment processing module 510 upon the patron placing winning bid(s). The output of the payment processing module 510 (e.g. payment completed) may then be sent to the output module 512, which generates an output signal comprising data to be rendered on an interface, e.g. a screen, of the patron's device 404.

In one embodiment, upon accessing the venue the day of the event, the user may present the access right (e.g. using the output device provided with their device 404) for scanning of a portion, e.g. a barcode (one dimensional or two dimensional, i.e. a matrix barcode), or the entirety of the access right using a suitable scanning device. Upon the access right being scanned, the system 400 may be provided with an identification of the user and may access the user profile stored in the memory 412 and/or databases 416. As discussed above, in another embodiment a proof of purchase is stored in the user's profile. Upon accessing the venue, the user may then present their mobile device to venue staff, which may use any suitable acquisition device to capture and process a signal emitted by the user's mobile device. The emitted signal may contain the user's profile information, particularly the user's proof of purchase, and may serve to authenticate the user and validate that they are authorized to access the venue (i.e. that the user has acquired legitimate rights for admission to the event). Additional authentication techniques, such as facial recognition, Bluetooth, Radio-frequency identification (RFID) access, or the like, may also be used by the profile management module 504 to authenticate users accessing the venue.

Upon reaching their seat, the user may further scan seat indicia (e.g. a barcode) provided on the seat. Alternatively, staff at the venue may use a device they may be provided with to access the system 400 and enter the seat indicia information manually into the system 400 using suitable input means or interface elements (not shown), such as a keyboard or touchscreen. It should be understood that other techniques may be used to obtain an indication of the current seat occupied by a given user. The system 400 may then compare the scanned seat indicia with the seat allocation information associated with the user's profile to determine whether the user has reached the correct seat. If the system 400 identifies a discrepancy between the scanned seat indicia and the stored seat allocation data, a message to that effect may be generated and presented to the user, thereby providing an indication that the user is in the wrong seat. In this manner, it can be ensured that each user remains in the seat they have been uniquely allocated upon winning their bid.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

The invention claimed is:

1. A computer-implemented method for managing access rights to an event, the method comprising:
receiving, at a receiving module of a server, from one or more devices, and during a bidding procedure having a bidding period associated therewith, bidding data comprising one or more bids for a number of seats at the event in one or more categories according to which the seats are grouped, each bid having one or more properties associated therewith, the one or more properties comprising a monetary value and a seat category corresponding to the monetary value;
classifying and dynamically reordering, in real-time, at a bidding module, each bid, the classifying and dynamically reordering based on the one or more properties;
providing real-time bidding suggestions based on bidding statistics, the bidding statistics derived by tracking the bidding data;
managing, at the bidding module, waitlisted bids based on the one or more properties associated therewith;
selecting, at a bidding module of the server and at an end of the bidding period, at least some of the one or more bids as successful bids as a function of the monetary value and a quantity of seats available in each of the one or more seat categories corresponding to the monetary value;
classifying, at the bidding module, the successful bids into one or more groups or subgroups based on the one or more properties associated with each successful bid, the one or more groups or subgroups corresponding to a priority level for seat selection;
and selectively granting, at a seat allocation module of the server, users, whose bids are successful, access to a virtual seat selection platform, by:
providing all of the users, whose bids are successful, concurrent access to the virtual seat selection platform, regardless of a group or a subgroup in which a bid has been classified, wherein a priority of seat selection is determined based on the group or the subgroup;
dynamically setting restrictions for seat selection such that each successful bid is guaranteed a set of seats that match the one or more properties associated with each bid;
activating, for each user whose bid is successful, an encrypted token, wherein the encrypted token is associated with a profile of the user, and wherein the encrypted token is activated in accordance with restrictions related to each user's bid;
in response to a seat selection received from a user and at a profile management module of the server, validating the user's encrypted token, the encrypted token containing data identifying the seat, venue, and event restrictions according to the user's bid;
assigning the selected seat to the user upon validation of the encrypted token; and
dynamically adjusting other available seat selections for each successful bid based on the seat selection made by the user while maintaining the one or more properties associated with other bids.

2. The computer-implemented method of claim 1, wherein receiving the one or more bids comprises receiving bids for a selected seat category, and wherein classifying and dynamically reordering the successful bids into the one or more groups or subgroups comprises sub-dividing bids for each seat category into groups according to the monetary value and the seat category associated with each bid, each group corresponding to a range of monetary values.

3. The computer-implemented method of claim 1, wherein each priority level corresponds to a seat category, and wherein selectively granting the users, whose bid is successful, access to the virtual seat selection platform comprises granting users dedicated access to seats in the seat category based on the one or more properties associated with the successful bids.

4. The method of claim 3, wherein providing the users within each group with dedicated access to the virtual seat selection platform comprises providing dedicated access to a higher priority level group before granting access to a lower priority level group.

5. The computer-implemented method of claim 1, wherein each successful bid is associated with a unique encrypted token.

6. The computer-implemented method of claim 1, the method further comprising:
accepting bids that are above a minimum bid value and rejecting bids below the minimum bid value;
and receiving payment data with real-time bidding data.

7. The computer-implemented method of claim 1, wherein the bidding statistics comprise a number of users placing bids, an average monetary value of each bid, and a number of bids satisfying a particular monetary value received during a designated timeframe, and wherein the method further comprises collecting payment data with the bidding data.

8. The computer-implemented method of claim 1, the method further comprising setting an admission price of the event in real-time as a function of the received bids.

9. The computer-implemented method of claim 1, wherein the real-time bidding suggestions comprise an indication of a likelihood that a bid will be successful, the monetary value required to win a bid, or both, the method further comprising:
classifying and dynamically reordering the one or more bids in real-time.

10. The computer-implemented method of claim 1, wherein managing waitlisted bids based on one or more properties associated therewith comprises assigning to a waitlist bids within a predetermined threshold value from a cutoff monetary value based on classifying and dynamically reordering the successful bids, and selecting bids from the waitlist when any of the successful bids are cancelled.

11. The method of claim 1, further comprising:
associating, with each user profile, an electronic wallet containing payment information and an image of the user configurable for authentication of the user during an authentication procedure.

12. The method of claim 1, further comprising:
activating the encrypted token, wherein activating the encrypted token indicates that a bid corresponding to the encrypted token is valid.

13. The method of claim 12, further comprising:
authenticating each user, whose bid is successful, by retrieving each user's profile to confirm that each user is authorized to access the virtual seat selection platform.

14. A system for managing access rights to an event, the system comprising:
a processing unit of a server;
and a non-transitory memory communicatively coupled to the processing unit and comprising computer-readable program instructions executable by the processing unit for:
receiving, at a receiving module of the server, from one or more devices, and during a bidding procedure having a bidding period associated therewith, bidding data comprising one or more bids for a number of seats at the event in one or more seat categories according to which seats are grouped, each bid having one or more properties associated therewith, the one or more properties comprising a monetary value and a seat category corresponding to the monetary value;
classifying and dynamically reordering, in real time, at a bidding module, each bid based on the one or more properties;
providing real-time bidding suggestions based on bidding statistics, the bidding statistics derived by tracking the bidding data;
managing, at the bidding module, waitlisted bids based on the one or more properties associated therewith;
selecting, at a bidding module of the server and at an end of the bidding period, at least some of the one or more bids as successful bids as a function of the monetary value, a quantity of seats requested per bid, and a quantity of seats available in each of the one or more seat categories corresponding to the monetary value;
classifying, at the bidding module, the successful bids into one or more groups or subgroups based on the one or more properties associated with each bid, the one or more groups or subgroups corresponding to a priority level for seat selection;
and selectively granting, at a seat allocation module of the server, users, whose bids are successful, access to a virtual seat selection platform, by:
providing all of the users, whose bids are successful, concurrent access to the virtual seat selection platform, regardless of a group or a subgroup in which a bid has been classified, wherein a priority of seat selection is determined based on the group or the subgroup;
dynamically setting restrictions for seat selection such that each qualifying bid is guaranteed a set of seats that match the one or more properties associated with each bid;
activating, for each user whose bid is successful, an encrypted token, wherein the encrypted token is associated with a profile of the user, and wherein the encrypted token is activated in accordance with restrictions related to each user's bid;
in response to a seat selection received from a user and at a profile management module of the server, validating the user's encrypted token, the encrypted token containing data identifying the seat, venue, and event restrictions according to the user's bid;
assigning the selected seat to the user upon validation of the encrypted token; and
dynamically adjusting other available seat selections for each successful bid based on the seat selection made by the user while maintaining the one or more properties associated with other bids.

15. The system of claim 14, wherein the one or more bids are received for a selected seat category, and classifying the successful bids into the one or more groups or subgroups comprises sub-dividing bids for each seat category into groups according to at least the monetary value and the seat category associated with each bid, each group corresponding to a range of monetary values.

16. The system of claim 14, wherein each priority level corresponds to a seat category, wherein selectively granting the users, whose bid is successful, access to the virtual seat selection platform comprises:
granting users dedicated access to seats in the seat category based on the one or more properties associated with the successful bids.

17. The system of claim 16, wherein providing the users within each group with dedicated access to the virtual seat selection platform comprises providing dedicated access to a higher priority level group before granting access to a lower priority level group.

18. The system of claim 14, wherein the computer-implemented program instructions are further configured for accepting bids that are above a minimum bid value and rejecting bids below the minimum bid value.

19. The system of claim 14, wherein the computer-implemented program instructions are further configured for collecting payment data with the bidding data.

20. The system of claim 14, wherein the computer-implemented program instructions are further configured for setting an admission price of the event in real-time as a function of the received bids.

21. The system of claim 14, wherein the computer-implemented program instructions are further configured for classifying and dynamically reordering the one or more bids in real-time.

22. The system of claim 14, wherein the computer-implemented program instructions are further configured for managing waitlisted bids based on the one or more properties associated therewith comprising assigning to a waitlist bids within a predetermined threshold value from a cutoff monetary value based on classifying and dynamically reordering the successful bids, and selecting bids from the waitlist when any of the successful bids are cancelled.

* * * * *

UNITED STATES PATENT AND TRADEMARK OFFICE
CERTIFICATE OF CORRECTION

PATENT NO. : 11,488,072 B2
APPLICATION NO. : 15/575770
DATED : November 1, 2022
INVENTOR(S) : Benoit Fredette Page 1 of 1

It is certified that error appears in the above-identified patent and that said Letters Patent is hereby corrected as shown below:

On the Title Page

Add --(73) Assignee: enovlab Inc., New York, NY (US)--.

Signed and Sealed this
Twenty-first Day of November, 2023

Katherine Kelly Vidal
*Director of the United States Patent and Trademark Office*